United States Patent
Gerding (10) Patent No.: US 7,029,378 B1
(45) Date of Patent: Apr. 18, 2006

(54) COMBINATION ROUTER-END MILL CUTTER TOOL, EDGER WITH COMBINATION TOOL, AND METHOD OF EDGING EYEGLASS LENSES

(75) Inventor: David W. Gerding, Barboursville, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

(21) Appl. No.: 10/963,747

(22) Filed: Oct. 14, 2004

(51) Int. Cl.
*B24B 9/14* (2006.01)
*B24B 9/20* (2006.01)

(52) U.S. Cl. .......................... 451/43; 451/461; 408/27

(58) Field of Classification Search .................. 451/43, 451/44, 240, 255, 256, 461; 408/22, 24, 408/26, 27
See application file for complete search history.

(56) References Cited

U.S. PATENT DOCUMENTS 4,841,676 A * 6/1989 Barwasser .................. 451/461
5,626,511 A * 5/1997 Kennedy et al. ............ 451/461
6,203,409 B1 * 3/2001 Kennedy et al. ............. 451/43
6,719,609 B1 * 4/2004 Mizuno et al. ............... 451/10

* cited by examiner

Primary Examiner—Jacob K. Ackun, Jr.
(74) Attorney, Agent, or Firm—Berenato, White & Stavish, LLC (57) ABSTRACT

The present invention relates to a tool for shaping and polishing an edge of an eyeglass lens. The tool includes a longitudinally extending body rotatable on the axis thereof, with a proximal portion and a distal portion. A first cutter extends axially and radially from the distal portion, and includes a first blade for shaping an edge of a lens. The distal portion has a first diameter defined by the first blade. A polishing hub is secured to and extends coaxially from the distal portion and is rotatable therewith. A second cutter is secured to and extends coaxially from the polishing hub and is rotatable therewith. The second cutter has a second blade for shaping the edge of the lens. The second blade defines a second diameter less than the first diameter. The present invention also relates to an edger having the disclosed tool, and a method of edging.

29 Claims, 8 Drawing Sheets

COMBINATION ROUTER-END MILL CUTTER TOOL, EDGER WITH COMBINATION TOOL, AND METHOD OF EDGING EYEGLASS LENSES

FIELD OF THE INVENTION

The present invention is directed to a tool for shaping and polishing an edge of an eyeglass lens. The tool includes a longitudinally extending body rotatable on the axis thereof, with a proximal portion and a distal portion. A first cutter extends axially and radially from the distal portion. The first cutter has a first blade for shaping an edge of a lens. The distal portion has a first diameter defined by the first blade. A polishing hub is secured to and extends coaxially from the distal portion and is rotatable therewith. A second cutter is secured to and extends coaxially from the polishing hub and is rotatable therewith. The second cutter has a second blade for shaping the edge of the lens. The second blade defining a second diameter less than the first diameter. The present invention is also directed to an edger having the disclosed tool, and a method of edging a lens.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The blanks are usually circular and of substantially larger dimension, for example 70 mm in diameter and 10 mm, compared to the relatively smaller finished lenses assembled into eyeglass frames. Therefore, a lens blank must be edged to fit an eyeglass frame selected by the patient.

Ophthalmic laboratory technicians cut, grind, edge, and polish blanks according to prescriptions provided by dispensing opticians, optometrists, or ophthalmologists. In addition, the large diameter blank is sized and shaped to fit into the frame selected by the patient. The lens blank may be shaped using an edger, such as the lens edger disclosed in U.S. Pat. No. 6,203,409 to Kennedy et al., the disclosure of which is incorporated herein by reference. The blank is edged so that the periphery of the finished lenses fit into the openings on the frames.

Edging of a lens blank typically requires the application of a block to a surface thereof. The block is releasably secured to a clamp assembly, so that rotation of the clamp assembly causes corresponding rotation of the lens blank. As the blank is rotated, the periphery of the blank may be cut to a desired size using a router tool. The lens periphery may also be polished using a polishing tool. A bevel is often formed about the lens, particularly adjacent the wearer.

The finished lens may then be assembled with the selected eyeglass frames. The frames include two spaced openings in which the finished lenses are mounted. The frame openings frequently have a bevel or a tongue, which interlocks with a complementarily shaped bevel or groove, respectively, formed about the peripheral edge of the lens. The interlock between the complementary bevel and groove helps to secure the lens within the opening. The router and polishing tools on the edger form the bevel or groove about the lens.

The configuration of the bevel or groove that is edged into the peripheral edge of the lens may vary depending on the configuration of the bevel or tongue in the frame openings. Therefore, various router and polishing tools are provided for forming different bevel or groove configurations. In addition, some frame designs are secured to protrusions extending from the peripheral edge of the lens. Such protrusions are often difficult to form using router blades having a relatively large diameter. Instead, the protrusions may be formed using an end mill cutter.

The router tools, polishing tools and end mill cutters are interchangeably secured on the edger via a shaft and chuck assembly. Thus, the technician must change the tool each time a different configuration of the lens edge is needed.

SUMMARY OF THE INVENTION

The present invention relates to a tool for shaping and polishing a peripheral edge of an eyeglass lens. The tool includes a longitudinally extending body rotatable on the axis thereof. The body has a proximal portion securable to a shaft and a distal portion. A first cutter extends axially and radially from the distal portion, and includes a first blade for shaping an edge of a lens. The distal portion has a first diameter defined by the first blade. A polishing hub is secured to and extends coaxially from the distal portion and is rotatable therewith. The polishing hub has a coating for polishing the edge of the lens. A second cutter is secured to and extends coaxially from the polishing hub and is rotatable therewith. The second cutter has a second blade for shaping the edge of the lens. The second blade defining a second diameter less than the first diameter.

The present invention is also directed to an edger for shaping a peripheral edge of an eyeglass lens. The edger includes a first table moveable in a first direction, and a first drive motor for controllably moving the first table in the first direction. A lens clamping and rotating assembly is secured to the first table and is moveable therewith. The rotating assembly controllably rotates a lens about a first axis extending generally transverse to the first direction. A second table is moveable in a second direction perpendicular to the first direction and parallel to the first axis. A second drive motor controllably moves the second table in the second direction. A router tool is mounted to the second table and is moveable therewith. The router tool is rotatable on a second axis parallel to the first axis.

The tool comprises a longitudinally extending body rotatable on the axis thereof. The body has a proximal portion and a distal portion. A first cutter extends axially and radially from the distal portion, and has a first blade for shaping an edge of a lens. The distal portion has a first diameter defined by the first blade. A polishing hub is secured to and extends coaxially from the distal portion and is rotatable therewith. The polishing hub has a coating for polishing the edge of the lens. A second cutter is secured to and extends coaxially from the polishing hub and is rotatable therewith. The second cutter has a second blade for shaping the edge of the lens. The second blade defines a second diameter less than the first diameter. A high-speed motor rotates the tool at a speed of up to 20,000 RPM.

An edger for shaping an edge of an eyeglass lens according to another embodiment is also disclosed. The edger according to the second embodiment includes a base plate, first and second tables, a lens clamping and rotating assembly, and a router tool. The first table is secured to the base plate and moveable in a first direction. A first drive motor controllably moves the first table in the first direction. The second table is secured to the first table and moves in a second direction perpendicular to the first direction. A second drive motor controllably moves the second table in the second direction. The lens clamping and rotating assembly is secured to the second table and moveable therewith. The rotating assembly controllably rotates a lens about a first axis extending generally parallel to the first direction and perpendicular to the second direction. The router tool is mounted to the base plate and rotatable on a second axis parallel to the first axis. The tool comprises a longitudinally extending body rotatable on the axis thereof. The body has a proximal portion and a distal portion. A first cutter extends axially and radially from the distal portion and has a first blade for shaping an edge of a lens. The distal portion has a first diameter defined by the first blade. A polishing hub is secured to and extends coaxially from the distal portion and is rotatable therewith. The polishing hub has a coating for polishing the edge of the lens. A second cutter is secured to and extends coaxially from the polishing hub and is rotatable therewith. The second cutter has a second blade for shaping the edge of the lens. The second cutter has a second diameter less than the first diameter. A high-speed motor rotates the tool at a speed of up to about 20,000 RPM.

A method for edging a peripheral edge of an eyeglass lens is disclosed. A lens blank having an edge is provided. A router tool is provided. The router tool has first and second cutters. The first cutter has a first blade for shaping an edge of a lens, and the first cutter defines a first diameter. A second cutter has a second blade for shaping the edge of the lens, and the second blade defines a second diameter less than the first diameter. The blank is rotated about its geometric axis thereof. A technician selects one of the first and second cutters for shaping the edge of the blank. The edge of the blank is then engaged with the selected cutter while the router tool is rotating up to 20,000 RPM, thereby shaping the edge to one of the first and second configurations corresponding to the selected blade.

BRIEF DESCRIPTION OF THE FIGURES

FIG. 3A is a plan view, partially in schematic, of an edger according to a second embodiment;

DETAILED DESCRIPTION OF THE INVENTION

Figure 1:
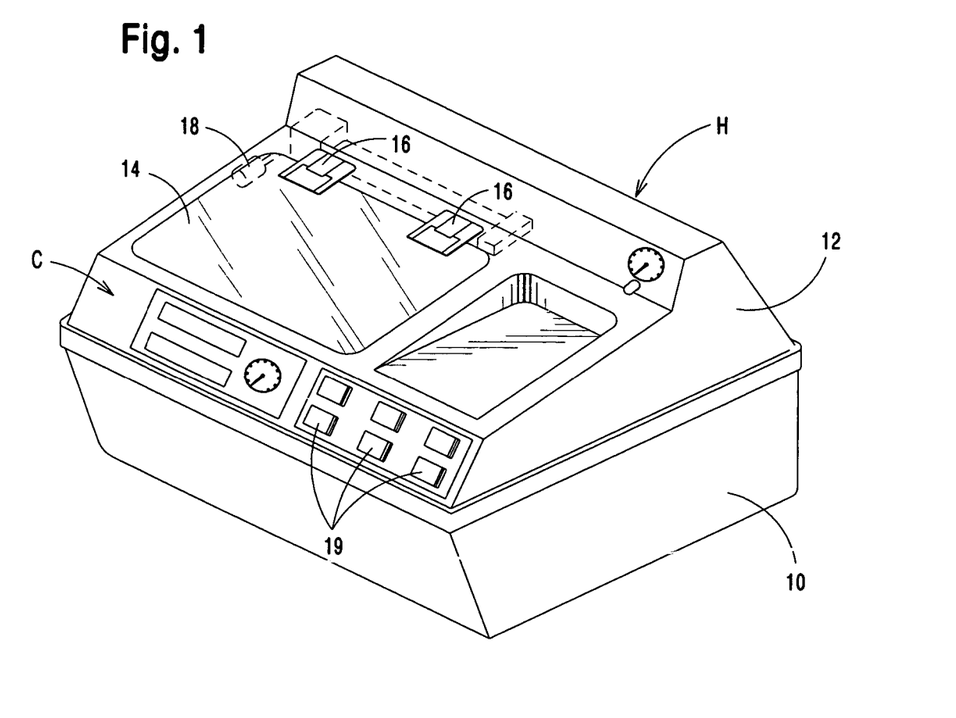
FIG. 1 is a perspective view of the housing of an edger according to an embodiment of the present invention.

As best shown in FIG. 1, an edger H according to a first embodiment of the present invention includes a housing, which encloses the components while permitting operator access to the controls C. The housing includes a lower housing portion 10 to which an upper housing portion 12 is hingedly connected. Upper portion 12 has a window 14 which may be opened by means of hinges or slides 16 to permit operator access to the interior of the housing. A switch 18 may be secured to window 14 and pivotal therewith, for preventing operation of edger H while window 14 is in the raised or open position. Control panel C is mounted to upper portion 12 and provides access by the technician to various controls, collectively 19, of edger H.

Figure 2:
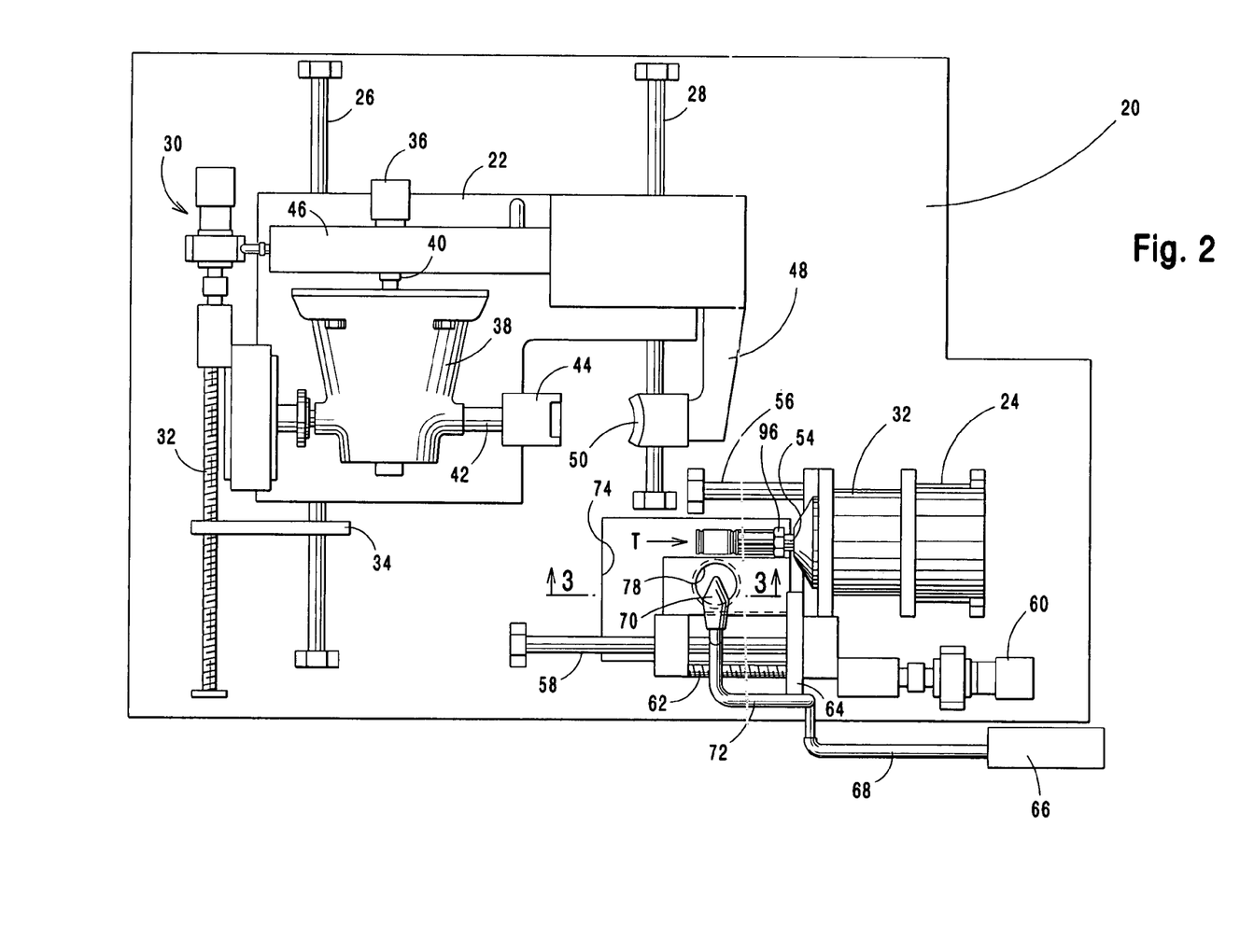
FIG. 2 is a plan view, partially in schematic, of the edger.

As best shown in FIG. 2, edger H includes a base plate 20 within the housing, to which tables 22 and 24 are mounted for movement perpendicular to each other. Rails 26 and 28 are secured to base 20 and extend in parallel in a first direction relative to base 20. First table 22 is slidably mounted to rails 26 and 28 for movement therealong in the first direction. Servomotor drive 30 is mounted to base 20 adjacent rail 26, and is operably connected to rotary screw 32 for causing controlled rotation thereof. Bracket 34 is secured to first table 22 along the forward edge thereof. Bracket 34 incorporates a ball nut threadedly engaged with rotary screw 32, so that rotation of screw 32 causes corresponding displacement of the ball nut and hence of bracket 34 and table 22.

Servomotor drive 36 is mounted to and carried by table 22, and is operably connected to transmission 38 through motor coupling 40. Shaft 42 extends from transmission 38 in a direction transverse to the first direction defined by rails 26 and 28. Shaft 42 is controllably rotated with precision because of servomotor drive 36 acting through transmission 38. Clamp assembly 44 is secured to the end of shaft 42, is rotatable therewith, and is adapted for engagement with an edging block removably secured to a lens blank to be edged.

Pneumatic lens clamp cylinder 46 is secured to first table 22 above drive 36, and the extensible piston thereof is operably engaged with arm 48 for causing movement thereof. Arm 48 carries second clamp assembly 50, which is adapted for engaging a lens blank. Actuation of clamp cylinder 46 by the technician through one of the controls 19 causes displacement of clamp assembly 50 either toward or away from clamp assembly 44, thereby clamping or releasing a blocked lens blank. As known in the art, a block is releasably secured to clamp assembly 44, so that rotation of clamp assembly 44 by shaft 42 causes corresponding rotation of the blocked lens blank about the axis of shaft 42.

High speed motor 52 is mounted to second table 24, and has a rotary shaft 54. The motor 52 preferably rotates shaft 54 at a speed up to 20,000 rpm. A router tool T is mounted to shaft 54, and is rotatable therewith in order for edging, polishing, and safety beveling the lens blank.

Rails 56 and 58 are secured to base 20 and extend in a second direction perpendicular to the first direction defined by rails 26 and 28. Second table 24 is slidably mounted to the rails 56 and 58 for movement in the second direction defined thereby. Servomotor drive 60 is secured to base 20, and drives rotary screw 62. Bracket 64 is secured to second table 24 and has a ball nut threadedly engaged with screw 62, so that rotation of screw 62 by motor 60 will cause corresponding displacement of bracket 64 and hence of second table 24. Because of the precision control provided by servomotor drive 60, rotary screw 62, and the ball nut of bracket 64, precise positioning of tool T relative to a lens blank clamped between and rotated by clamp assemblies 44 and 50 is achieved in order to permit the edging, polishing, and safety beveling process to proceed.

A water supply 66 may be operably associated with base 20. A supply line 68 leads to a spray nozzle 70, which is secured to bracket 64 by tubing or light pipe 72, and maintains orientation of nozzle 70 relative to tool T as second table 24 slides on the rails 56 and 58. Those skilled in the art will appreciate that pumps and pressure controls are provided in conjunction with water supply 66 so that there is adequate water pressure for droplet formation by nozzle 70.

Figure 3:
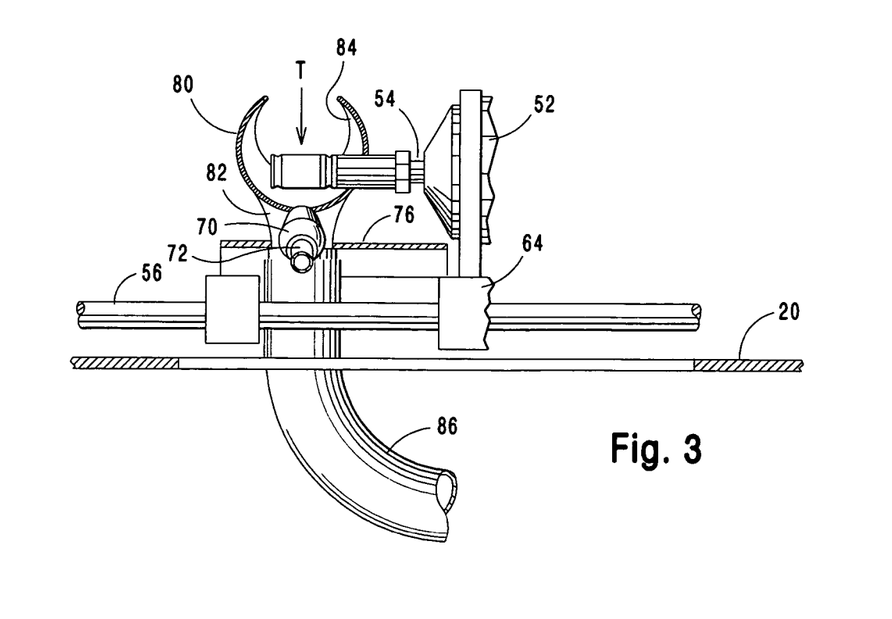
FIG. 3 is a fragmentary elevational view taken along line 3—3 of FIG. 2 and viewed in the direction of the arrows.

As best shown in FIGS. 2 and 3, a rectangular opening 74 may be formed in base 20. A chip chute 76 is mounted to table 24 through brackets or the like, and defines a plate partially closing opening 74. Aperture 78 is formed in chip chute 76 below tool T. A cowl 80 has a duct-like portion 82 fitted within aperture 78 of chip chute 76. Cowl 80 has a slot 84 providing an opening adjacent tool T for permitting a lens blank clamped between assemblies 44 and 50 to be brought into engagement with tool T through operation of servomotor drive 30. Vacuum line 86 is secured to duct 82 below chip chute 76 for applying a vacuum to cowl 80. Vacuum line 86 terminates at a vacuum source, and causes air, particulates, and water mist to be drawn through cowl 80 to the vacuum source. Because of opening 74, vacuum line 86 is permitted to move with table 24 as the table moves in response to operation of servomotor drive 60.

An edger H2 according to a second embodiment is best shown in FIG. 3A. Some components of edger H2 are identical to components of edger H, and are identified with like reference numerals. Edger H2 may include a lower housing portion 10 and upper housing portion 12 as described above, and as shown in FIG. 1.

As best shown in FIG. 3A, edger H2 includes a base plate 20A within the housing. Preferably, base 20A includes a wall 21 extending outwardly from and perpendicular to base 20A. High speed motor 52 is mounted directly to base 20A, and may be mounted to wall 21 using brackets or the like. Wall 21 includes an opening through which rotary shaft 54 extends (not shown). Motor 52 preferably rotates shaft 54 at a speed of up to 20,000 rpm. Router tool T is mounted to shaft 54 as described above. As in the first embodiment, a water supply may be operably associated with base 20A proximate router tool T, including a supply line and spray nozzle.

A first plate 22A is mounted on base 20A via rails 26A, 28A. Rails 26A, 28A are secured to base 20A and extend in parallel in a first direction relative to base 20A. Plate 22A is slidably mounted to rails 26A, 28A for movement thereal-ong in a first direction. Servomotor drive 30A is mounted to base 20A, and is operably connected to rotary screw 32A for causing controlled rotation thereof. Servomotor drive 30A may be mounted to wall 21 adjacent motor 52, in which case wall 21 includes an opening through which rotary screw 32A extends. First plate 22A includes a bracket (not shown) that engages rotary screw 32A so that rotation of screw 32A causes movement of first plate 22A along rails 26A, 28A.

A second plate 24A is secured to first plate 22A via rails 56A, 58A (rail 58A is not shown). Rails 56A, 58A are secured to first plate 22A and extend parallel to each other in a second direction perpendicular to the first direction defined by rails 26A, 28A. Second plate 24A is slidably mounted to rails 56A, 58A for movement in the second direction defined thereby. Preferably, rails 56A, 58A lie on a plane spaced from the plane of rails 26A, 28A so that movement of first and second plates 22A, 24A in the first and second directions is not hindered by rails 26A, 28A and 56A, 58A. Servomotor drive 60A is secured to first plate 22A, and drives a rotary screw (not shown). A bracket is secured to second plate 24A which engages the rotary screw so that rotation of the screw by motor 60A causes movement of second plate 24A along rails 56A, 58A.

A servomotor drive 36A is mounted to and carried by second plate 24A, and is operably connected to a transmission 38A through a motor coupling 40A. A shaft 42A extends from transmission 38A in a direction parallel to the first direction defined by rails 26A, 28A. Shaft 42A is controllably rotated with precision by servomotor drive 36A acting through transmission 38A. As in the first embodiment, a clamp assembly 44A is secured to the end of shaft 42A, and is rotatable therewith. Clamp assembly 44A is adapted for engagement with an edging block removably secured to a lens blank to be edged.

An electric lens clamp cylinder 46A is secured to second plate 24A adjacent drive 36A, and the extensible piston thereof is operably engaged with arm 48A for causing movement thereof. Arm 48A carries second clamp assembly 50A, which is adapted for engaging a lens blank. Actuation of clamp cylinder 46A by the technician through one of the controls causes displacement of clamp assembly 50A either toward or away from clamp assembly 44A, thereby clamping or releasing a blocked lens blank.

An opening 74A may be formed in base 20A. A chip chute 76A is mounted to base 20 with brackets or the like, and defines a plate partially covering opening 74A. Chip chute 76A may be similar to chip chute 76 in configuration, and a detailed description of same will not be repeated. Similarly, a vacuum line may be provided below chip chute 76A and mounted on base 20A, which causes air, particulates, and water mist to be drawn through an associated cowl to the vacuum source.

Figure 4:
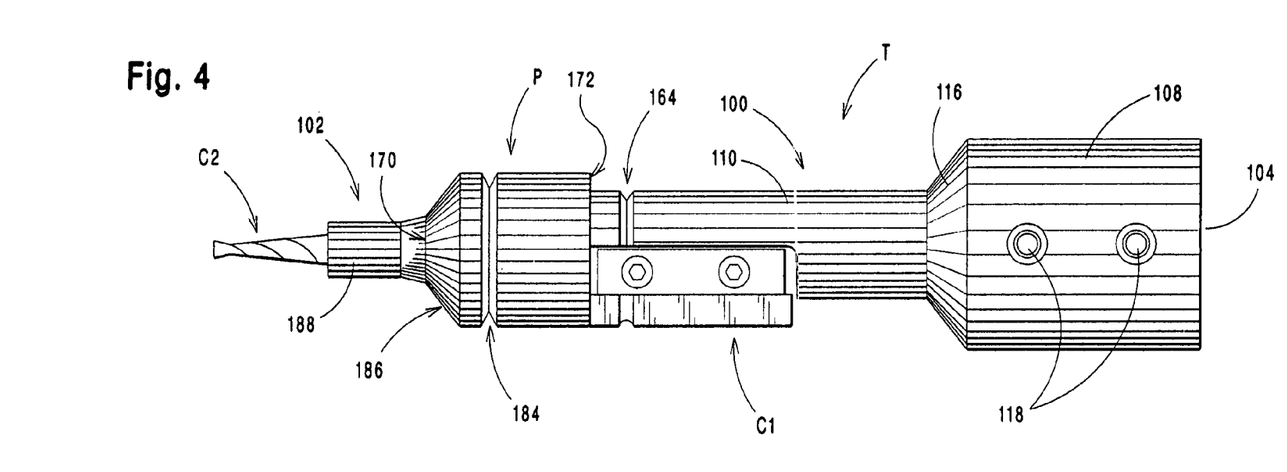
FIG. 4 is an elevational view of a router tool according to an embodiment of the present invention.

Referring now to FIGS. 4 through 9, tool T includes a longitudinally extending body rotatable on the axis thereof. As best shown in FIG. 4, the body includes a first portion 100 having a first cutter C1, a polishing hub P secured to and extending coaxially from first portion 100, and a second portion 102 secured to and extending coaxially from polishing hub P. Second portion 102 includes a second cutter C2.

Figure 5:
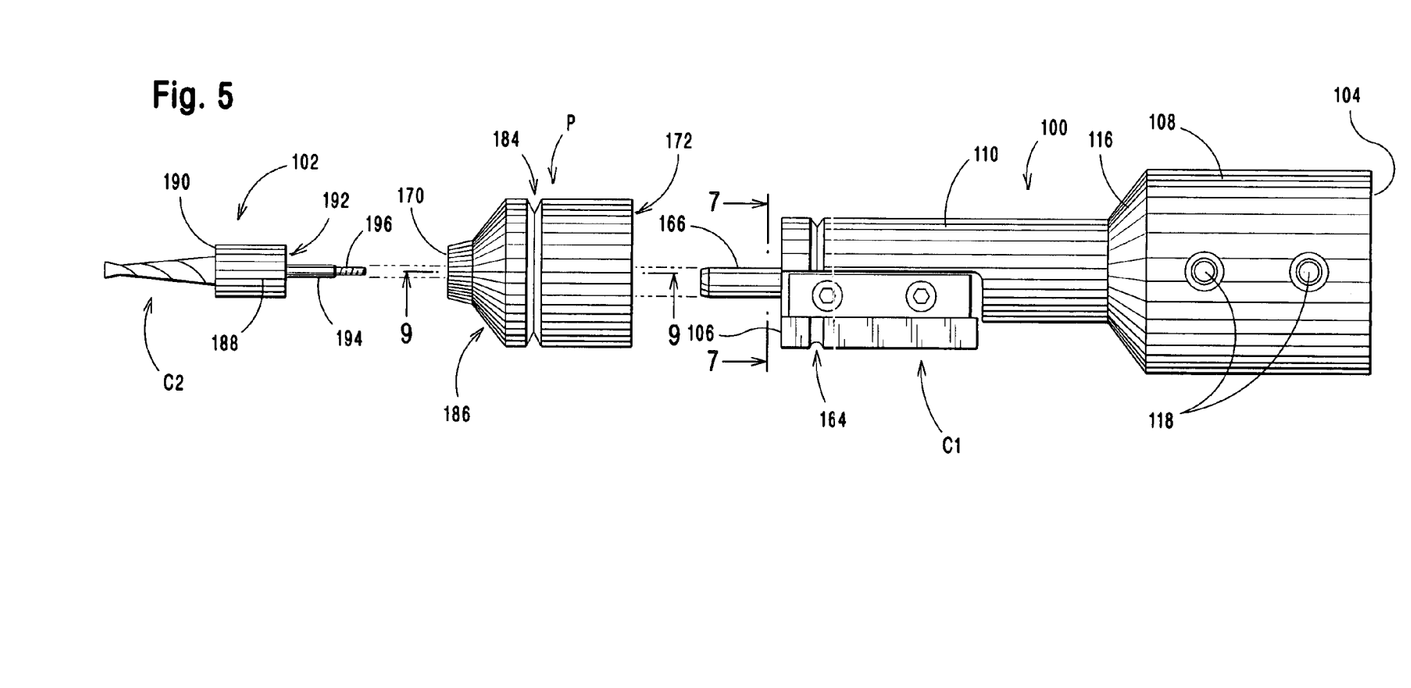
FIG. 5 is an assembly view of the router tool of FIG. 4.
Figure 6:
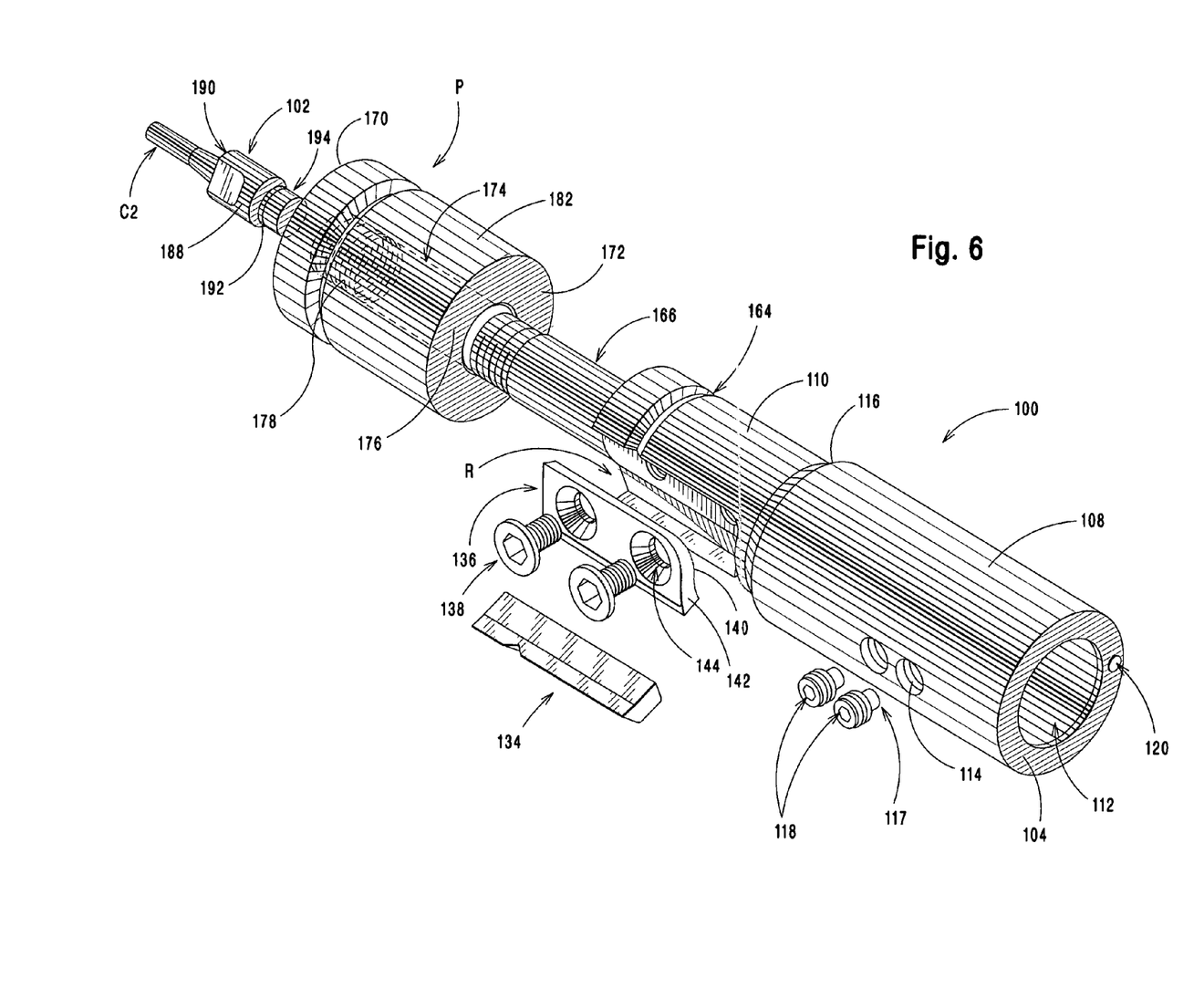
FIG. 6 is a perspective assembly view of a router tool according to another embodiment, with portions shown in phantom.

As best shown in FIGS. 4–6, first portion 100 includes first and second opposing ends 104, 106, with a proximal portion 108 proximate first end 104 and a distal portion 110 proximate second end 106. Preferably, both proximal and distal portions 108, 110 have a generally cylindrical configuration. Proximal portion 108 preferably has a diameter greater than the diameter of distal portion 110. First portion 100 may be manufactured from grade 303 stainless steel.

Proximal portion 108 may include a coaxially extending bore 112 extending inwardly from first end 104 into proximal portion 108, as best shown in FIG. 6. Bore 112 is configured to receive shaft 54 therein. Threaded openings 114 extend into proximal portion 108 intermediate first end 104 and an interface 116 between proximal portion 108 and distal portion 110. Interface 116 is therefore intermediate and integral with proximal portion 108 and distal portion 110. Preferably, interface extends at an angle between proximal and distal portions 108, 110. Threaded openings 114 preferably extend perpendicularly to bore 112. Threaded fasteners 118 may be screwed into threaded openings 114, so that the leading ends 117 of fasteners 118 extend into bore 112.

Tool T may be releasably secured to shaft 54 on edger H by sliding shaft 54 into bore 112. Fasteners 118 are then screwed into openings 114 so that leading ends 117 of fasteners 118 are tightened against shaft 54, thereby securing tool T to shaft 54. However, it would be apparent to one skilled in the art that tool T may be secured to shaft 54 using other securing means, such as a clamp or bolts. Alternatively, bore 112 may be threaded for engaging a corresponding threaded portion (not shown) of shaft 54.

Proximal portion 108 may also include a second coaxially extending bore 120 extending inwardly from first end 104 into proximal portion 108, and spaced from and parallel to bore 112. Second bore 120 may be provided so that tool T is balanced when tool T is axially rotated. Second bore 120 typically has a diameter substantially less than the diameter of bore 112, as best shown in FIG. 6. However, it should be understood that the exact dimensions of second bore 120 may vary depending on the overall configuration of tool T.

Figure 7:
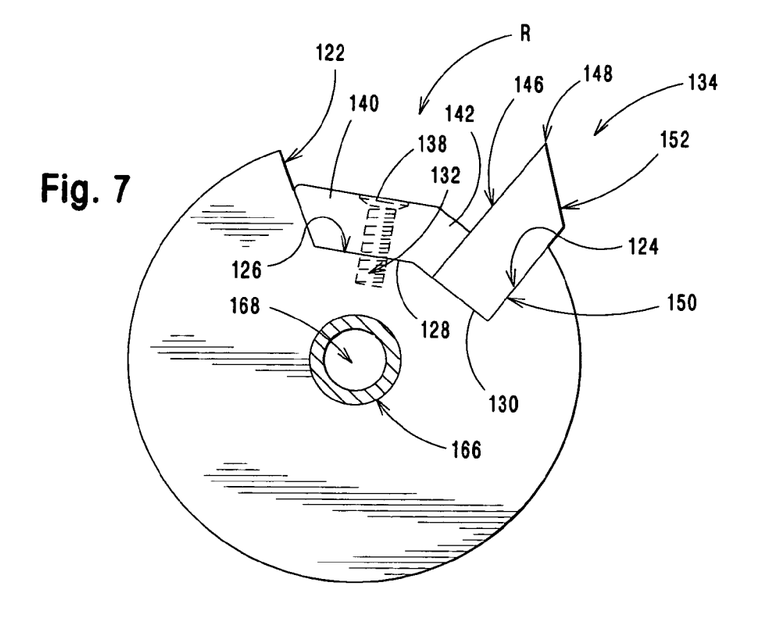
FIG. 7 is a cross-sectional view taken along line 7—7 of FIG. 5 and viewed in the direction of the arrows.

Distal portion 110 of first portion 100 includes a recess R for receiving first cutter C1, as best shown in FIGS. 6 and 7. Recess R includes first and second sidewalls 122, 124 extending inwardly to a base 126. Base includes a first portion 128 and a second portion 130. Preferably, first portion 128 lies on a plane that is angularly disposed relative to the plane of second portion 130, as best shown in FIG. 7. First portion 128 includes two threaded bores 132 extending into distal portion 110, which preferably extend inwardly perpendicular to the plane of first portion 128.

As best shown in FIG. 6, first cutter C1 includes a blade 134, a mounting bracket 136, and mounting screws 138. Mounting bracket 136 includes a major portion 140 and a leg 142 angularly disposed relative to major portion 140. Major portion 140 has openings 144 through which the threaded portions of mounting screws 138 may be passed. Mounting bracket 136 is received within recess R so that openings 144 are aligned with threaded bores 132 in first portion 128 of recess R. Mounting bracket 136 may then be secured in recess R using mounting screws 138.

Although first cutter C1 is shown in FIGS. 4–6 as having a mounting bracket 136 with two openings 144 and two corresponding mounting screws 138, it would be understood to one skilled in the art that mounting bracket 136 may be configured to have only one opening 144 or three or more openings 144. The number of mounting screws used may depend on the overall configuration of blade 134. It should also be understood that other fasteners may be used for securing blade 134 to distal portion 110.

Figure 8:
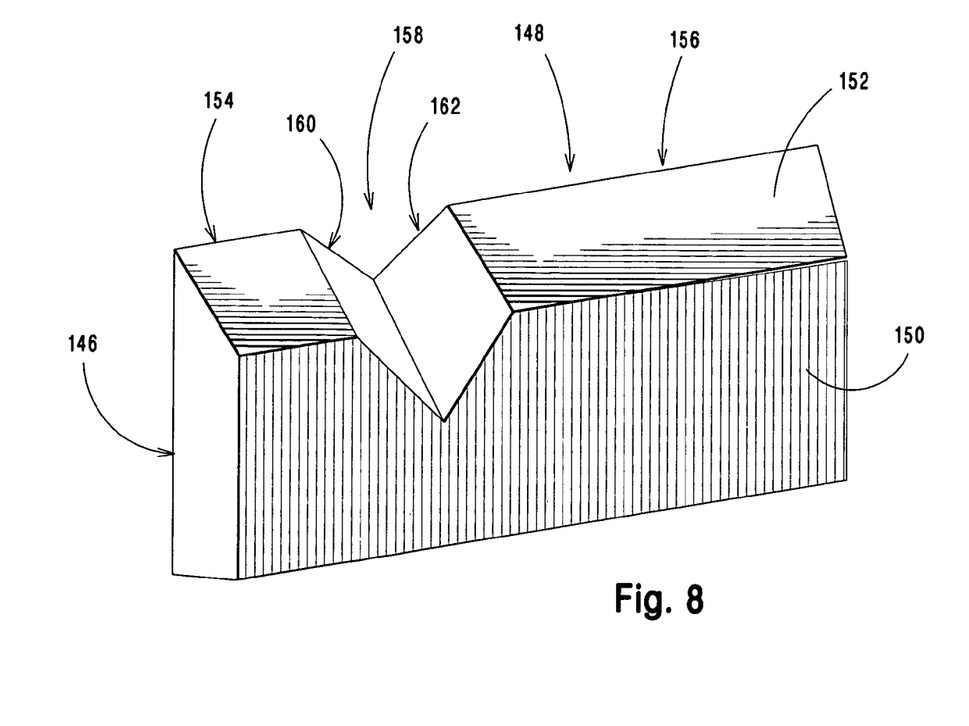
FIG. 8 is a perspective view of a blade according to one embodiment.

As best shown in FIGS. 7 and 8, blade 134 includes a first side 146 having a cutting edge 148, a second side 150, and a sloped portion 152 extending downwardly from cutting edge 148 to second side 150. Cutting edge 148 may have any desired configuration, depending on the desired shape to be formed in the perimeter of the lens blank during the edging operation.

As best shown in FIG. 8, cutting edge 148 may include a first edge 154, a second edge 156 spaced from first edge 154, and a contoured edge 158 intermediate and integral with first and second edges 154, 156. First and second edges 154, 156 may be either coplanar, or they may lie on planes that are spaced from each other. Contoured edge 158 may be V-shaped, with first and second walls 160, 162. First wall 160 extends downwardly from first edge 154 at a first angle, and second wall 162 extends downwardly from second edge 156 at a second angle. First and second angles may be the same, or first and second walls 160, 162 may extend downwardly at different angles.

It should be understood that cutting edge 148 may have any configuration. For example, contoured edge 158 may include a portion having an arcuate profile and/or a portion that is substantially perpendicular to first or second edges 154, 156. Contoured edge 158 may also extend outwardly relative to first and second edges 154, 156. Thus, cutting edge 148 shown in FIG. 8 is for purposes of explanation only, and the invention is not limited to same.

The configuration of cutting edge 148 is a mirror image of the edge that will be formed about the perimeter of the lens blank. Thus, an inwardly extending V-shaped contoured edge 158 will form an outwardly extending V-shaped bevel about the perimeter of a lens. Similarly, a cutting edge 148 having an outwardly extending contoured edge (not shown) will form an inwardly extending groove about the perimeter of the lens blank.

As best shown in FIG. 7, blade 134 is positioned in recess R and against second portion 130 of base 126, so that second side 150 of blade 134 abuts second sidewall 124 of recess R. When blade 134 is positioned in recess R, cutting edge 148 extends axially and radially from distal portion 110. Mounting bracket 136 is positioned in recess R, with openings 144 aligned with threaded bores 132 in first portion 128 of base 126. Leg 142 of mounting bracket 136 abuts first side 146 of blade 134. The threaded portions of mounting screws 138 pass through openings 144, and may be screwed into threaded bores 132. As mounting screws 138 are screwed into threaded bores 132, leg 142 is tensioned against first side 146 of blade 134 due to the angular configuration of leg 142. Thus, as mounting bracket 136 is secured in recess R, blade 134 is also secured therein. Blade 134 may be easily removed and/or replaced by simply loosening mounting screws 138, thereby releasing the tension between leg 136 and first side 146 of blade 134. Once mounting bracket 136 is loosened, blade 134 may be easily slipped out of recess R.

Distal portion 110 of first portion 100 may include a groove 164 formed peripherally about distal portion 110 and aligned axially with contoured edge 158 when blade 134 is secured in recess R, as best shown in FIGS. 4–6. If blade 134 is being installed and/or replaced, the technician simply lines up contoured edge 158 with groove 164. Groove 164 permits contoured edge 158 and therefore blade 134 to be precisely oriented in recess R.

As best shown in FIGS. 5 and 6, distal portion 110 preferably includes a coaxially extending projection 166 extending outwardly from second end 106 of first portion 100. Projection 166 may include an internally threaded coaxial bore 168 extending inwardly from the distal end of projection 166, as best shown in FIG. 7.

As best shown in FIGS. 4 and 5, polishing hub P preferably has a generally cylindrical configuration, with opposing first and second ends 170, 172. Polishing hub P preferably has a diameter corresponding to the diameter of distal portion 110 as defined by cutting edge 148 of blade 134, as best shown in FIG. 4.

Figure 9:
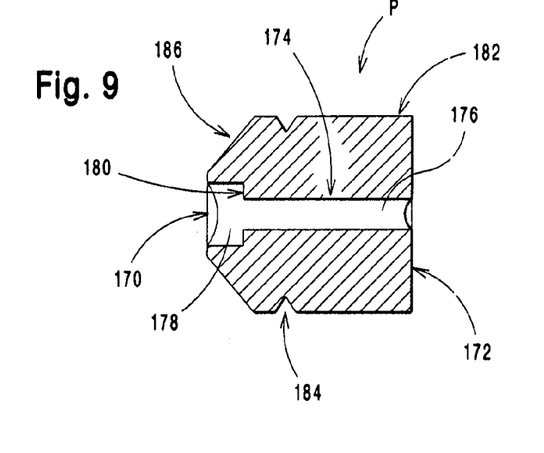
FIG. 9 is a cross-sectional view taken along line 9—9 of FIG. 5 and viewed in the direction of the arrows.
Figure 10:
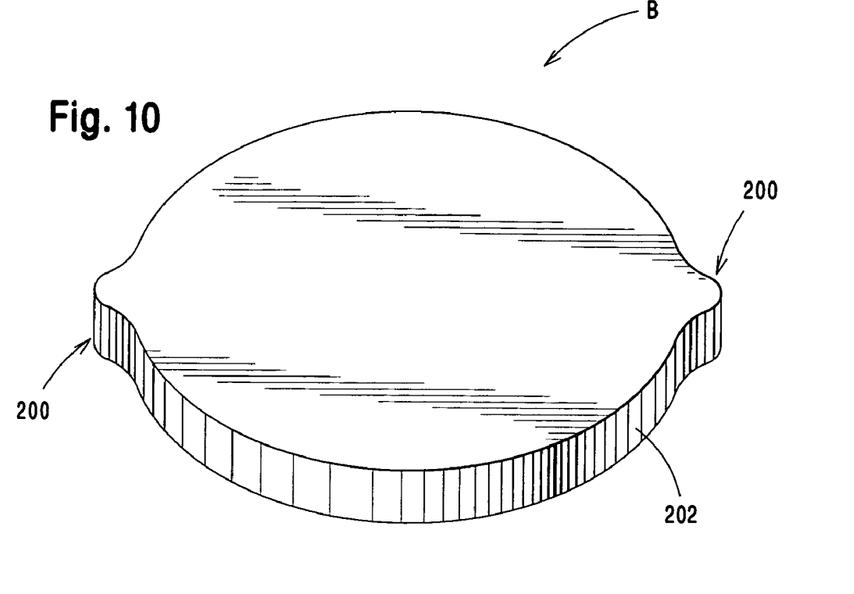
FIG. 10 is a perspective view of a lens with protrusions formed in the peripheral edge.

As best shown in FIGS. 9 and 10, polishing hub P may include a coaxially extending bore 174 extending therethrough, from first end 170 to second end 172. In one embodiment, bore 174 includes a first portion 176 having a first diameter and extending inwardly from second end 172 of polishing hub P, and a second portion 178 having a second diameter greater than the first diameter extending inwardly from first end 170 of polishing hub, as best shown in FIG. 9. A shoulder 180 is intermediate and connects first and second portions 176, 178 of bore 174. First portion 176 of bore 174 is configured for receiving projection 166 therein.

Preferably, polishing hub P has throughout the entirety of its outer lens-contacting surface 182 a 600 grit diamond material bonded thereto, such as provided by Inland Diamond Company. The diamond bond preferably has a thickness of about 0.125 inch in order to accommodate wear, and provides an abrasive coating with numerous fine cutting edges. As known in the art, the edging process sometimes causes the resulting blank edge to have a smoky or distressed finish. The smoky finish is believed to arise from microscopic score lines formed in the edge of blank while being edged. The diamond grit material on polishing hub P removes the score lines creating the smoky finish, as well as other imperfections, so that the resulting edge of the blank has a polished translucent appearance. The 600 grit diamond material is preferably bonded in a bronze-iron matrix. It should be understood that polishing hub P may include other abrasive coatings, such as finer or coarser diamond grit. Further, the diamond grit or other abrasive coating may be plated onto polishing hub P. The coating used will depend on the desired finish on the lens blank, as well as the material used to form the lens blank.

Polishing hub P may include a V-notch 184 formed about outer surface 182 and parallel to groove 164 on distal portion 110, as best shown in FIG. 4. V-notch 184 extends continuously about outer surface 182. V-notch 184 has a similar configuration to contoured edge 158 of blade 134, so that the resulting bevel in the lens blank formed by cutting edge 148 may be aligned with V-notch 184. In this way, the perimeter of the lens blank, including the formed bevel, may be polished without removing the bevel. V-notch 184 may have any desired configuration, preferably matching the configuration of contoured edge 158.

As best shown in FIGS. 4, 5 and 9, polishing hub P may also include a chamfer 186 extending angularly and outwardly from first end 170 to outer surface 182 relative to the axis of rotation. Preferably, chamfer 186 extends at an angle of 45°. Chamfer 186 provides an angled surface upon which to remove the sharp corner formed at the intersection between the major surfaces and the perimeter edge of the resulting lens. The corner of the lens is adjacent the wearer, and thus removing that corner promotes safety by reducing the possibility that the wearer may become cut if contacted by that corner.

As best shown in FIGS. 4–6, second portion 102 includes a central body 188 having a generally cylindrical configuration with first and second ends 190, 192. A second cutter C2 extends outwardly from first end 190. Second cutter C2 may be an end mill cutter. Second cutter C2 has a diameter less than the diameter distal portion 110 as defined by cutting edge 148 of blade 134 when secured thereto, as best shown in FIGS. 4 and 5.

As best shown in FIGS. 5 and 6, second portion 102 also includes a projection 194 extending outwardly from second end 192 of central body 188, and coaxial with second cutter C2. Projection 194 preferably has a generally cylindrical configuration, with a diameter less then the diameter of central body 188. Projection 194 also preferably includes a threaded end 196, as best shown in FIG. 5.

As best shown in FIGS. 5 and 6, tool T is assembled by inserting projection 166 of first portion 100 into first portion 176 of polishing hub P so that second end 172 abuts second end 106 of distal portion 110. Then, projection 194 of second portion 102 is inserted into second portion 178 of polishing hub P until threaded end 196 of projection 194 engages threaded coaxial bore 168 in projection 166. Threaded end 196 is screwed into bore 168 until a tight connection is achieved. When tightened therein, projection 194 extends into first portion 176 of polishing hub, and a portion of central portion 188 adjacent second end 192 fits into second portion 178 of bore 174 of polishing hub P. Preferably, second end 192 abuts shoulder 180 of polishing hub P. It should be understood, however, that polishing hub P may be independently secured to first portion 100, and second portion may be independently secured to polishing hub P.

As best shown in FIG. 10, a lens blank B may be shaped to have knobs 200 extending outwardly from the perimeter 202 of blank B. The resulting lens have knobs that may then be secured to "rimless" frames which clamp onto the knobs 200, as opposed to conventional frames which surround the perimeter 202 of the lens. Such knobs 200 may be difficult to form using a cutter having a relatively large diameter, given the angle between the perimeter 202 and the portion of the knob extending outwardly therefrom is restricted by the diameter of the cutter being used. Second cutter C2 has a relatively small diameter compared to first cutter C1, and allows for precision edging even between surfaces disposed from each other by relatively sharp angles.

Figure 11:
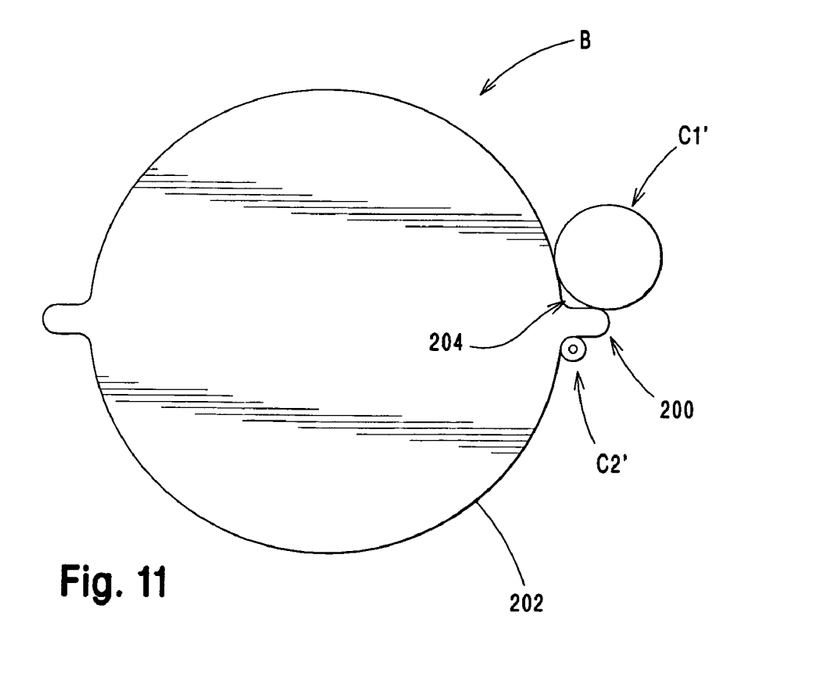
FIG. 11 is an elevational view of a lens showing the diameters defined by first and second blades.

For example, as best shown in FIG. 11, it would be difficult to form a knob 200 that extends outwardly from perimeter 202 at a relatively sharp angle using a cutter C1' having a relatively large diameter. Cutter C1' is unable to remove all of the material near the base 204 of knob 200 due to the relatively large diameter of cutter C1', as shown in FIG. 11. A cutter C2' having a relatively small diameter is better able to form the steep sides of knob 200.

Therefore, tool T includes first portion having a first cutter C1 for shaping an edge of a lens. First cutter C1 defines a first diameter. Second portion includes second cutter C2 also for shaping the edge of the lens, but having a second diameter less than the first diameter. When secured to shaft 54 on edger H, a technician may select one of first and second cutters C1, C2 for shaping the edge of the blank to the desired configuration. The perimeter 202 of the blank B engages the selected cutter C1 or C2 as tool T is rotated by edger H, preferably rotating at up to 20,000 RPM. Tool T may be used to form various configurations about the perimeter 202 of blank B, as well as polish blank B to shape and finish the resulting lens.

It will be apparent to one of ordinary skill in the art that various modifications and variations can be made in construction or configuration of the present invention without departing from the spirit of the invention. Therefore, it is intended that the present invention include all such modifications or variations, provided they come within the scope of the following claims and their equivalents.

I claim as follows:

1. A tool for shaping and polishing a peripheral edge of an eyeglass lens, comprising:
    a longitudinally extending body rotatable on the axis thereof, said body having a proximal portion securable to a shaft and a distal portion;
    a first cutter extending axially and radially from said distal portion, said first cutter having a first blade for shaping an edge of a lens, said distal portion having a first diameter defined by said first blade;
    a polishing hub secured to and extending coaxially from said distal portion and rotatable therewith, said polishing hub having a coating for polishing the edge of the lens; and
    a second cutter secured to and extending coaxially from said polishing hub and rotatable therewith, said second cutter having a second blade for shaping the edge of the lens, said second blade defining a second diameter less than said first diameter.

2. The tool of claim 1, wherein said second cutter is an end mill cutter.

3. The tool of claim 1, wherein said polishing hub is generally cylindrical with first and second ends.

4. The tool of claim 3, wherein said polishing hub has a diameter substantially equal to said first diameter.

5. The tool of claim 3, wherein said polishing hub includes a coaxially extending bore extending from said first end to said second end.

6. The tool of claim 5, wherein said body further comprises a projection extending outwardly from and coaxial with said distal portion, said projection receivable in said polishing hub bore.

7. The tool of claim 6, wherein said projection including a coaxially extending, threaded bore extending from an outer end into said projection.

8. The tool of claim 7, wherein said second cutter includes a threaded projection opposite said second blade, said threaded projection receivable in said polishing hub bore through said second end, said threaded projection releasable securable in said threaded bore so that said polishing hub is securable therebetween.

9. The tool of claim 1, wherein said polishing hub includes a first portion proximate said first cutter and a second portion proximate said second cutter.

10. The tool of claim 9, wherein said second portion has a chamfer.

11. The tool of claim 1, wherein said coating is a diamond grit coating.

12. The tool of claim 1, wherein said first blade includes a first edge, a second edge spaced from said first edge, and a contoured edge intermediate and integral with said first and second edges, said contoured edge for forming a bevel about the edge of the lens.

13. The tool of claim 12, wherein said contoured edge is V-shaped.

14. The tool of claim 12, further comprising a groove formed peripherally about said distal portion and aligned axially with said contoured edge.

15. The tool of claim 14, wherein said groove is V-shaped.

16. The tool of claim 1, wherein said distal portion is generally cylindrical.

17. The tool of claim 1, wherein said proximal portion is generally cylindrical and has a third diameter greater than said first diameter.

18. The tool of claim 1, wherein said proximal portion includes a coaxially extending bore extending from a first end into said proximal portion for receiving the shaft therein.

19. The tool of claim 1, wherein said distal portion includes a recess having a base and first and second sidewalls.

20. The tool of claim 19, wherein said first cutter is releasably securable in said recess.

21. The tool of claim 20, wherein said base includes a first portion lying on a first plane, and a second portion angularly disposed relative to the plane of said first portion.

22. The tool of claim 21, wherein said first cutter is removeably securable in said second portion using a mounting bracket and fastener.

23. The tool of claim 22, wherein said first portion includes a threaded bore for receiving said fastener and securing said mounting bracket thereto.

24. The tool of claim 22, wherein said mounting bracket includes a major portion and a leg angularly disposed relative to said major portion.

25. The tool of claim 24, wherein a first side of said first cutter is positioned against said first sidewall of said recess, and said leg is releaseably tensioned against a second side of said first cutter opposite said first side for securing said cutter therein.

26. An edger for shaping a peripheral edge an eyeglass lens, comprising:
a first table moveable in a first direction, and a first drive motor for controllably moving said first table in said first direction;
a lens clamping and rotating assembly secured to said first table and moveable therewith, said rotating assembly for controllably rotating a lens about a first axis extending generally transverse to said first direction;
a second table moveable in a second direction perpendicular to said first direction and parallel to said first axis, and a second drive motor for controllably moving said second table in said second direction;
a router tool mounted to said second table and moveable therewith, said router tool rotatable on a second axis parallel to said first axis and said tool comprising a longitudinally extending body rotatable on the axis thereof, said body having a proximal portion and a distal portion, a first cutter extending axially and radially from said distal portion, said first cutter having a first blade for shaping an edge of a lens, said distal portion having a first diameter defined by said first blade, a polishing hub secured to and extending coaxially from said distal portion and rotatable therewith, said polishing hub having a coating for polishing the edge of the lens, and a second cutter secured to and extending coaxially from said polishing hub and rotatable therewith, said second cutter having a second blade for shaping the edge of the lens, said second cutter having a second diameter less than said first diameter; and
a high-speed motor for rotating said tool at a speed of up to about 20,000 RPM.

27. The edger of claim 26, further comprising a nozzle secured to said second table and moveable therewith, said nozzle disposed adjacent to and aligned with said router tool for selectively directing coolant fluid thereto.

28. An edger for shaping an edge of an eyeglass lens, comprising:
a base plate;
a first table secured to said base plate and moveable in a first direction, and a first drive motor for controllably moving said first table in said first direction;
a second tables secured to said first table and moveable in a second direction perpendicular to said first direction, and a second drive motor for controllably moving said second table in said second direction;
a lens clamping and rotating assembly secured to said second table and moveable therewith, said rotating assembly for controllably rotating a lens about a first axis extending generally parallel to said first direction and perpendicular to said second direction;
a router tool mounted said base plate, said router tool rotatable on a second axis parallel to said first axis and said tool comprising a longitudinally extending body rotatable on the axis thereof, said body having a proximal portion and a distal portion, a first cutter extending axially and radially from said distal portion, said first cutter having a first blade for shaping an edge of a lens, said distal portion having a first diameter defined by said first blade, a polishing hub secured to and extending coaxially from said distal portion and rotatable therewith, said polishing hub having a coating for polishing the edge of the lens, and a second cutter secured to and extending coaxially from said polishing hub and rotatable therewith, said second cutter having a second blade for shaping the edge of the lens, said second cutter having a second diameter less than said first diameter; and
a high-speed motor for rotating said tool at a speed of up to about 20,000 RPM.

29. A method for edging a peripheral edge of an eyeglass lens, comprising the steps of:
   providing a lens blank having an edge;
   providing a router tool having a first cutter having a first blade for shaping an edge of a lens, the first cutter defining a first diameter, and a second cutter having a second blade for shaping the edge of the lens, the second cutter defining a second diameter less than the first diameter;
   rotating the blank about the geometric axis thereof;
   selecting one of the first and second cutters for shaping the edge of the blank; and
   engaging the edge with the selected cutter while the router tool is rotating up to 20,000 RPM and thereby shaping the edge to one of the first and second configurations corresponding to the selected blade.

* * * * *